US005829111A

United States Patent [19]

Affleck

[11] Patent Number: 5,829,111

[45] Date of Patent: Nov. 3, 1998

[54] AFFLECK GROMMET REMOVER

[76] Inventor: William G. Affleck, 10930-141 A Street, Surrey, B. C., Canada, V3R 3J9

[21] Appl. No.: 785,920

[22] Filed: Jan. 21, 1997

[30] Foreign Application Priority Data

Jan. 24, 1996 [CA] Canada .................................. 2164135

[51] Int. Cl.[6] ...................................................... B23P 19/04

[52] U.S. Cl. ............................ 29/268; 269/248; 269/278; 269/283; 81/418

[58] Field of Search .............................. 29/268, 267, 255, 29/259, 221, 223, 232, 283, 278; 81/176.15, 418, 421; 254/23, 28, 27

[56] References Cited

U.S. PATENT DOCUMENTS

| | | | |
|---|---|---|---|
| 858,257 | 6/1907 | Breiding | 254/28 |
| 1,393,399 | 10/1921 | Schlehr | 81/418 |
| 1,450,875 | 4/1923 | Teselsky | 81/418 |
| 1,891,164 | 12/1932 | Kluglein | 254/23 |
| 2,070,217 | 2/1937 | Seger | 254/28 |
| 3,934,286 | 1/1976 | Metzinger | 254/28 |
| 5,283,936 | 2/1994 | Pickles et al. | 29/267 |

*Primary Examiner*—James G. Smith
*Assistant Examiner*—Lee Wilson

[57] ABSTRACT

A pliers-like hand tool is provided for removing plastic grommets or other similar insert members embedded within concrete during a post tensioning or other forming process of concrete construction. The hand tool includes two hand members each having a jaw end portion, handle end portion and intermediate neck portion, being pivotally connected between the neck portion in a well known structure for gripping a workpiece between the jaws. A fulcrum protrusion is formed with the tool at a point near the jaw end and acts to provide a bearing on the concrete for a leverage action which is caused by pressure being applied to the handle ends against the concrete in order to extract the grommet which has been gripped between the jaws of the tool. It makes the removal of grommets easier in a labour-and-time-saving way. It is also helpful to preserve the grommets for future re-use.

8 Claims, 4 Drawing Sheets

AFFLECK GROMMET REMOVER

The present invention relates to a hand tool for removing insert members from an embedded position recessed in a cavity in concrete, particularly for removing plastic grommet sleeves that become embedded in concrete during the post tensioning and forming process of concrete construction.

BACKGROUND OF THE INVENTION

Presently, these grommet sleeves and other similar insert members, such as 'snap-tie' inserts, are removed from the concrete with screwdrivers, pliers, vice grips and other conventional tools. These methods can be quite time consuming and labour intensive, and therefore, expensive on large construction sites where many of these sleeves must be removed, once the forms are stripped from the dried concrete. Thus, there has been a need in the field of construction for a tool that makes the removal of these sleeves easier than conventional tools. U.S. Pat. No. 4,995,299 discloses a tool that can transmit torque to a grommet sleeve in order to remove the grommet from an embedded position within concrete.

SUMMARY OF THE INVENTION

It is an object of this invention to provide a hand tool that can be used to cause a leverage action to extract a grommet sleeve or similar member from the embedded position recessed in a cavity in concrete.

In accordance with one aspect of the present invention there is provided a hand tool for removing an insert member embedded in a cavity in concrete during a forming process of concrete construction. The hand tool comprises a first and second rigid elongated hand members, each having a jaw end portion, a handle end portion and an intermediate neck portion. The hand tool further comprises a pivot member connecting the first and second hand members at their neck portions for permitting the jaw end portions to move towards each other in response to an initial manual closing action of the handle end portions to grip the insert member between the jaw end portions. The first hand member further comprises a fulcrum member which extends from the neck portion in an opposite direction away from the handle end portion and in alignment with the handle end portion, the fulcrum protrusion being adapted to provide a bearing on a surface of the concrete for a leverage action which is caused by pressure applied to the handle end portions in order to extract the insert member the fulcrum protrusion being shorter than the jaw end portion. In an embodiment of the present invention the hand tool is provided for removing a grommet embedded in a cavity in concrete during a post-tensioning process of concrete construction. The hand tool comprises a first and second hand members, each having a jaw end portion, a handle end portion and an intermediate neck portion. A slidable and pivotable connection is provided, between the first and second hand members at their neck portions so that an initial manual closing action of the handle end portions when they are in a normally open condition causes a point of the second hand member to move slidably with respect to the first hand member along a sliding axis for moving the jaw end portions towards each other to grip the grommet and then a further manual closing action of the handle end portions halts the sliding movement and causes the hand members to pivot relative to each other about the point for further holding the grommet securely between the jaw end portions. The first hand member further has an integral fulcrum protrusion on the neck portion, the fulcrum protrusion being shorter than the jaw end portion, and extending in an opposite direction away from the handle end portion to provide a bearing on a surface of the concrete for a leverage action which is caused by pressure applied to the handle end portions in order to have extract the grommet.

Conveniently, the handle end portions have a length greater than the distance between the fulcrum protrusion and the jaw end portions.

The present invention advantageously provides a special tool to achieve the object in a very efficient, simple, time-and-labour saving method. Another advantage of the present invention is that the method used with the tool is helpful to preserve the grommet without damages for future reuse.

BRIEF DESCRIPTION OF THE DRAWINGS

The present invention will be further understood from the following description with reference to the drawings in which.

DETAILED DESCRIPTION OF THE INVENTION

Figure 1:
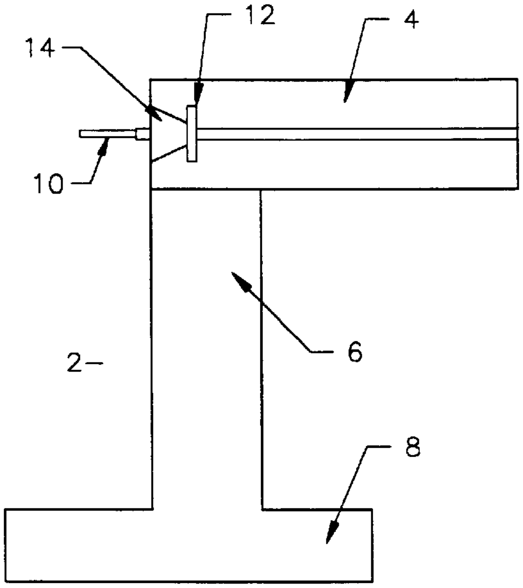
Fig.1 Prior Art
FIG. 1 shows a cross-sectional plan view of a wall using the post-tensioning process with a cutaway section to reveal the grommet and cable.
Figure 2:
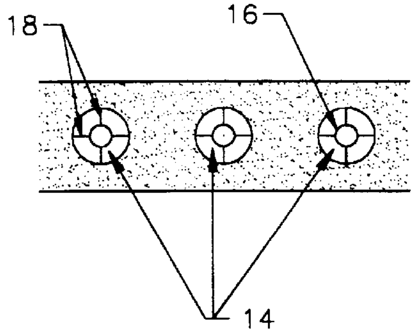
Fig.2 Prior Art
FIG. 2 shows a front plan view of a concrete beam with the post-tension grommets embedded in the concrete.
Figure 3:
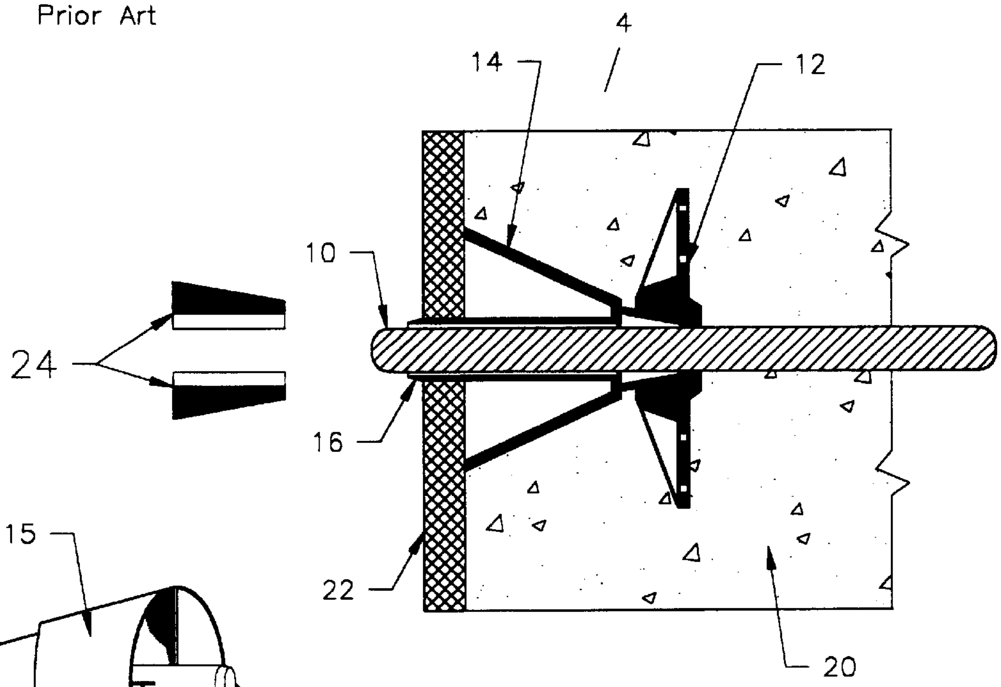
Fig.3 Prior Art
FIG. 3 shows a detailed cross-section view of the concrete beam of FIG. 1.

FIGS. 1–3 shows a concrete construction 2 using the post-tensioning process. A beam 4 to be post-tensioned is supported by a wall 6 which in turn is supported by a footing 8. A cable 10 extends through the beam 4 and delivers the post tensioning pressure to the beam 4 upon the removal of the forms 22 from the beam 4. If a wide slab is intended to be post tensioned, as shown in FIG. 2, or an entire floor is to be post tensioned, a plurality of cables will be extended parallel to one another across the entire width of the slab or floor. A grommet 14 is inserted through the plate 12. The cable 10 is then inserted through the plate and grommet assembly. The plate 12 is secured to the form 22 by nails or some other fasteners (not shown). In the present invention the cable 10 is suspended within the form 22 by the plate and grommet assemblies at either end of the forms 22.

Wet concrete is poured all around the plate 12, grommet 14 and cable 10 as best seen in FIG. 3. Once the concrete has dried and cured for an adequate amount of time, the forms 22 are stripped from the dried concrete 20. FIG. 2 shows a front view of a concrete slab with the forms stripped and the grommets 14 still embedded in the concrete recessed in cavities defined by sleeve bodies 15 of the grommets 14. At this time the grommets must be removed to proceed with the post-tensioning process. Once the grommets 14 are removed, lock wedges 24 are inserted into the embedment plate 12 where the grommet previously resided. A hydraulic cable tensioning device, or ram, is then attached to the cable 10 and is tensioned to the proper degree.

Figure 4:
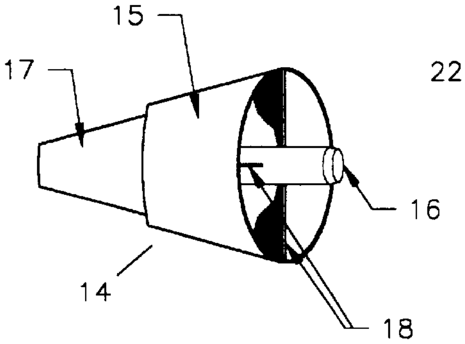
Fig.4 Prior Art
FIG. 4 shows a perspective view of the grommet shown in FIGS. 1–3.

FIG. 4 shows a detailed view of the grommet 14 which usually is made of plastics and includes an internal protrusion 16 extending out of the body sleeve 15 and away from the concrete. The grommet 14 also includes an external protrusion 17 which extends into the embedment plate 12 and concrete 20. Both protrusions include a central bore therethrough to support the cable 10. Transverse flanges 18 are arranged about the internal protrusion 16 at 90, 180, 270 and 360 degrees on the body sleeve 15.

Figure 5:
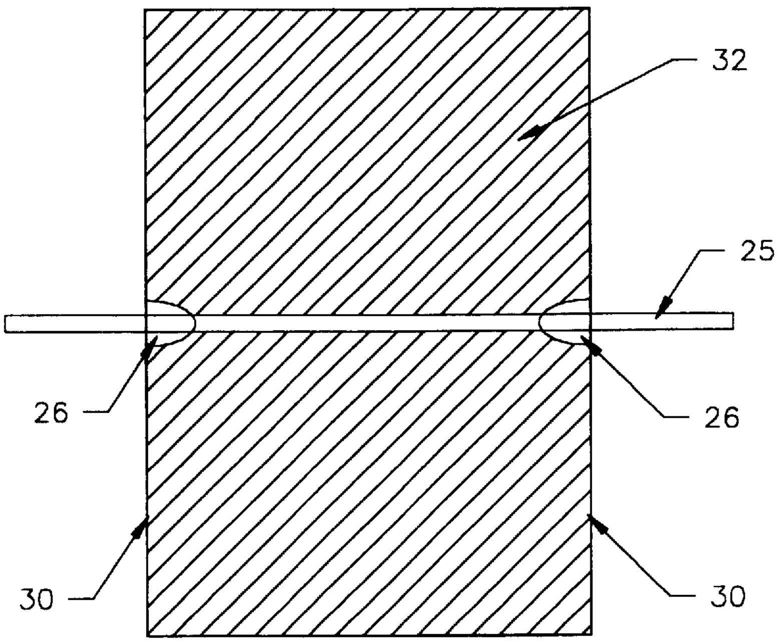
Fig.5 Prior Art
FIG. 5 shows a cross-sectional view of a wall using 'snapties', during the forming process of concrete construction with a cut away section to reveal the inserts and snap-ties.
Figure 6:
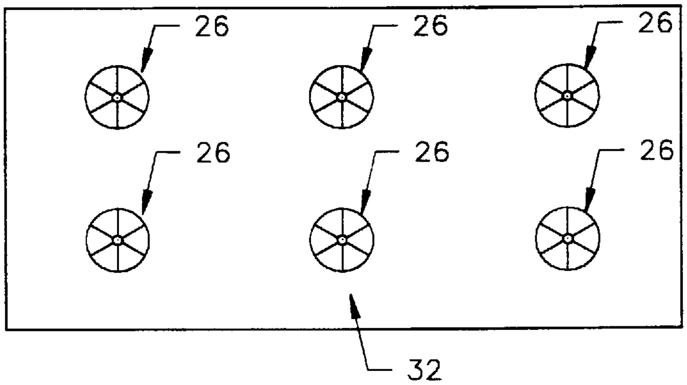
Fig.6 Prior Art
FIG. 6 shows a front view of the concrete wall with the inserts left after the removal of the snap-tie.
Figure 7:
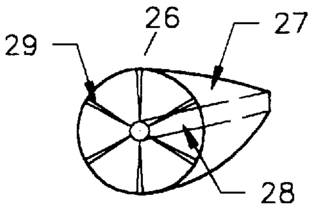
Fig.7 Prior Art
FIG. 7 shows a perspective view of the insert shown in FIGS. 5 and 6.

FIG. 5 and 6 show another forming process of concrete construction in which "snap-ties" are used. Similarly as in the post-tensioning process, the "snap-tie" is a thin metal bar 25 with a plastic insert 26 on each end, which is set to keep the forms 30 apart at a desired distance. After concrete 32 is poured and forms are stripped, the metal protruding from concrete, shown in FIG. 5, is snapped off leaving the plastic inserts, as shown in FIG. 6. FIG. 7 shows a detailed perspective view of the plastic insert 26 which includes a tapered body sleeve 28 and a central tube 30 for supporting the metal bar 24. Transverse flanges 29 are arranged about the central tube 28 at 60, 120, 180, 240, 300 and 360 degrees on the body sleeve 27.

The present invention deals with the removal of the grommets or other similar insert members such as the inserts used with "snap-ties" once the forms are stripped from the dried concrete. As shown in FIGS. 2 and 6, there can be many of these embedded grommets 14 or inserts 26 on a construction site. It is common practice today for a worker to use pliers and/or screwdrivers to pry the grommets or inserts from the concrete. This removal procedure can be quite painstaking when concrete has seeped into the body sleeve or when the body sleeve has become damaged during the pouring of the concrete. In addition, these conventional tools used to pry the grommets or inserts sometimes damage the grommets or inserts during the removal procedure. Thus, a tool to make the removal job easier would be a considerable time-saving tool. Furthermore, a tool better to preserve the grommets or inserts without damage during the removal procedure for future reuse would be a considerable cost-saving tool.

Figure 8:
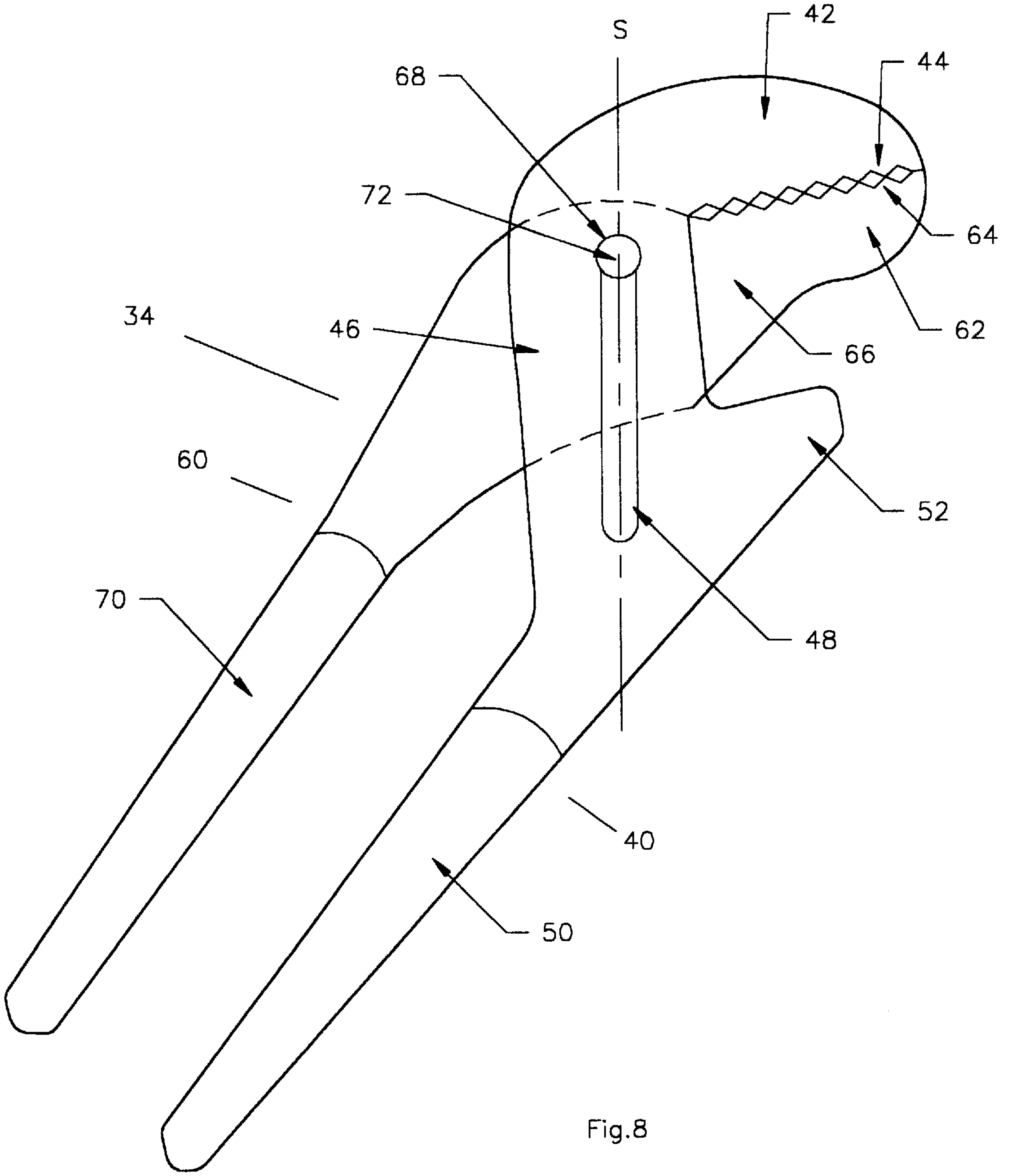
FIG. 8 shows a side elevational view of the embodiment of the present invention.
Figure 9:
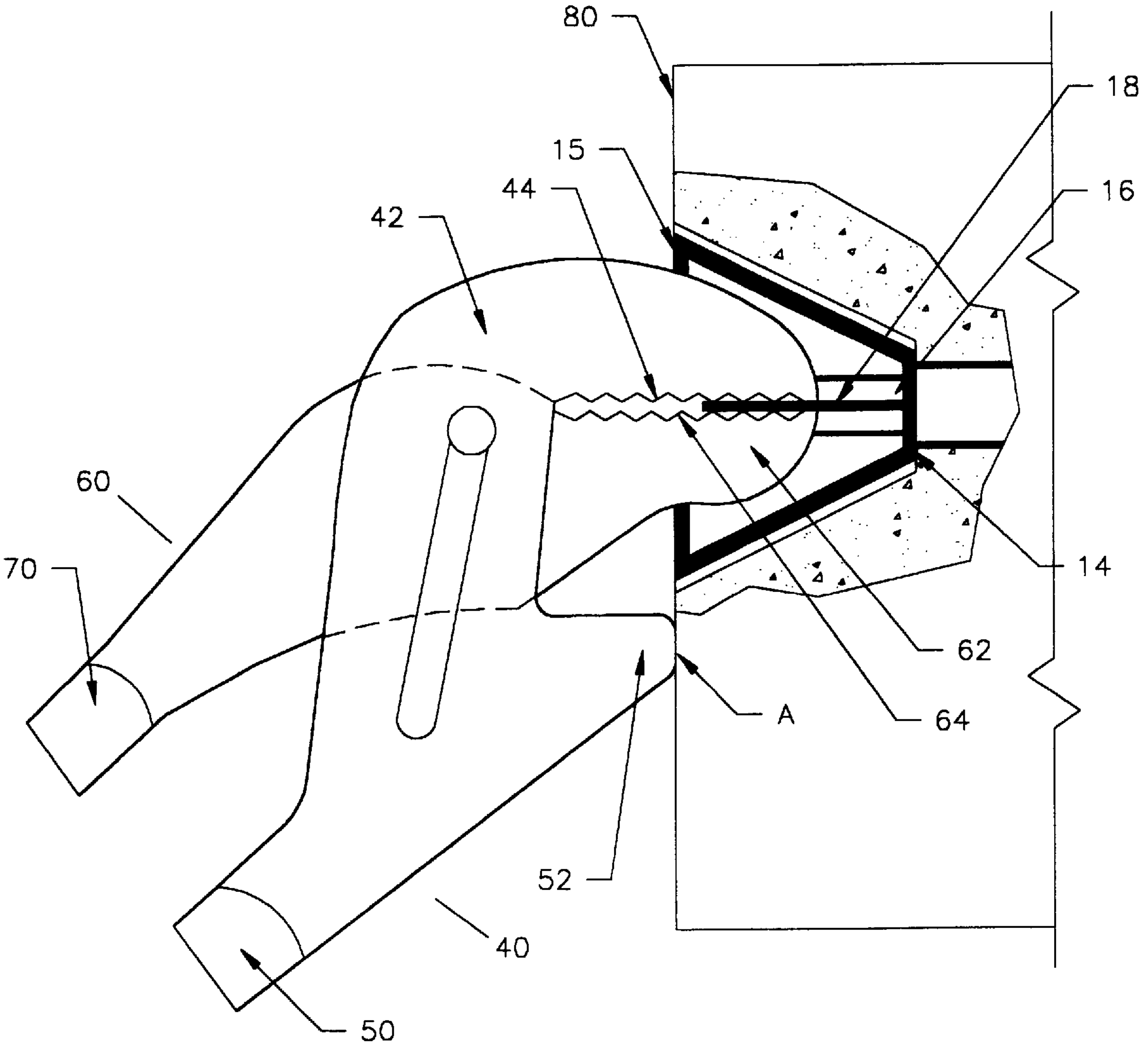
FIG. 9 shows a side elevational view of the hand tool shown in FIG. 8 in an application of the removal of the grommet embedded in concrete, with a partial cutaway section of the concrete to reveal the flange being gripped between the two jaw end portions of the hand tool.

Referring to FIGS. 8 and 9 of the drawings, there is illustrated a hand tool according to an embodiment of the present Invention. The hand tool 34 includes two rigid elongated hand members 40 and 60, preferably formed of steel, and interconnected in a known pliers-like configuration to enable a single-handed operation by a user. The elongated hand member 40 includes a tapered jaw end portion 42 having a mating face 44 with a row of teeth. Integral with the jaw end portion 42 and extending therefrom is a neck portion 46. The neck portion has an elongated, oval slot 48 formed therethrough with a longitudinal slot axis S which is disposed substantially perpendicular to the mating face 44.

Integral with the neck portion 46 and extending therefrom at the opposite end of the slot 48 from the jaw end potion 42 are an elongated handle end portion 50 and a fulcrum protrusion 52 in opposite directions. The fulcrum protrusion 52 has a round and smooth end surface for a good bearing contact with the concrete surface in its application. The distance between the extremity of the fulcrum protrusion 52 and axis S is less than the distance between the extremity of the jaw end portion 42 and the axis S.

The elongated hand member 60 includes a jaw end portion 62 having a mating face 64 with a row of teeth. Integral with the jaw end portion 62 and extending therefrom is a neck portion 66 of reduced thickness. The neck portion 66 has a bore 68 formed therethrough.

Integral with the neck portion 66 and extending therefrom is a handle end portion 70.

A pivot member 72, such as a rivet or a bolt and nut, is provided through the slot 48 and the bore 68, pivotally connecting the two elongated hand members 40 and 60. Therefore, an initial manual closing action of the handle end portions 50 and 70 when they are in a normally open condition causes the elongated hand member 60, with the pivot member 72 being guided within the slot 48, to move slidably with respect to the elongated hand member 40 along the axis S for moving the jaw end portions 42 and 62 towards each other until the mating faces 44 and 64 have gripped the flange 18 therebetween. A further manual closing action of the handle end portions 50 and 70 halts the sliding movement and causes the jaw end portions 42 and 62 to pivot relative to each other about the pivot member 72 to hold the flange 18 securely.

The application of the hand tool, for the removal of an embedded grommet for example, is shown in FIG. 9. After the tapered jaw end portions 42 and 62 are inserted into the cavity defined by the body sleeve 15 beside the internal protrusion 16 and have gripped one of the flange 18 therebetween, and the fulcrum protrusion 52 is positioned against the concrete surface 80, pressure being applied to the handle end portions 50 and 70 causes at the jaw end portions 42 and 62 a leverage action which extracts the grommet away from the concrete in the direction substantially perpendicular to the concrete surface 80. In this application, the fulcrum protrusion 52 acts as to provide a bearing on the concrete surface 80 for the leverage action. The handle end portions 50 and 70 should have a much longer length than the length between the bearing point "A" of the fulcrum protrusion and the mating faces of the jaw end portions 42 and 62 for a strong leverage action. The fulcrum protrusion 52 being shorter than the jaw end portions 42 and 62 ensures that the mating faces align properly with the flange having been gripped. The flange 18 usually is substantially perpendicular to the concrete surface.

The application of the hand tool for the removal of "snap-ties" inserts is in a similar manner.

The length of the slot 48 is not essential and the slot can be shortened, for example, to a bore the same as the bore 68. In this case, without causing a sliding movement, the initial manual closing action of the handle end portions directly causes the jaw end portions pivot toward each other about the pivot member to grip the flange.

The hand tool can be made in various sizes for applications with different sizes of grommets or other similar embedded insert members.

It should be apparent that many modifications could be made to the hand tool which would still be encompassed within the spirit of the present invention. It is intended that all such modifications may fall within the scope of the appended claims.

I claim:

1. A hand tool for removing an insert member embedded in a cavity in concrete during a forming process of concrete construction, the hand tool comprising:

a first and second rigid elongated hand members, each having a jaw end portion, a handle end portion and an intermediate neck portion;

a pivot member connecting the first and second hand members at their neck portions for permitting the jaw end portions to move towards each other in response to an initial closing action of the handle portions to grip the insert member between the jaw end portions;

the first hand member further comprising a fulcrum protrusion which extends from the neck portion in an opposite direction away from the handle end portion and in alignment with the handle portion, the fulcrum protrusion being adapted to provided a bearing on a surface of the concrete for a leverage action which is caused by pressure applied to the handle end portions in order to extract the insert member, the fulcrum protrusion being shorter than the jaw end portion.

2. A hand tool for removing a grommet embedded in a cavity in concrete during a post-tensioning process of concrete construction, the hand tool comprising:

a first and second rigid elongated hand members, each having a jaw end portion, a handle end portion and an intermediate neck portion;

a slidable and pivotable connection between the first and second hand members at their neck portions so that an initial manual closing action of the handle end portions when they are in a normally open position causes a point of the second hand member to move slidably with respect to the first hand member along a sliding axis for moving the jaw end portions towards each other to grip the grommet and then a further manual closing action of the handle end portions halts the sliding movement and causes the hand members to pivot relative to each other about the point for further holding the grommet securely between the jaw end portions, the first hand member further having an integral fulcrum protrusion on the neck portion, the fulcrum protrusion being shorter than the jaw end portion, and extending in an opposite direction away from the handle end portion in alignment with the handle end portion to provide a bearing on a surface of the concrete in a leverage action, caused by pressure applied to the handle end portions in order to extract the grommet.

3. A hand tool according to claim 1 wherein the pivot member extends through a bore and a slot, the bore being formed through the neck portion of the second hand member, the slot having a longitudinal axis and being formed in the neck portion of the first hand member so that the movement of the jaw end portions starts as a sliding movement along the axis to grip the insert member and continues as a pivot movement for securely gripping the insert member.

4. A hand tool according to claim 2 wherein the connection includes a pivot member extending through a bore and slot, the bore extending at the point through the neck portion of the second hand member, the slot extending through the neck portion of the first hand member and having a longitudinal axis which is superposed on the sliding axis.

5. A hand tool according to claim 4 wherein the jaw end portions comprise a pair of mating faces for gripping the grommet, the mating faces being substantially perpendicular to the sliding axis of the slot.

6. A hand tool according to claim 1, 2, 3, 4 or 5 wherein the handle portions have a length greater than a distance between the fulcrum protrusion and the jaw end portions.

7. A hand tool according to claim 1, 2, 3 or 4 wherein the jaw end portions are tapered for insertion into the cavity.

8. A hand tool for removing a member embedded in a body and recessed in a cavity in the body comprising:

a first rigid elongated hand member having a jaw end portion, handle end portion and an intermediate neck portion with a fulcrum protrusion, the jaw end portion having a mating face, the neck portion defining therethrough a slot having a longitudinal slot axis which is substantially perpendicular to the mating face, the fulcrum protrusion and the handle end portion extending in opposite directions from the neck portion at the opposite end of the slot from the jaw end portion, a distance from the slot axis to an extremity of the fulcrum protrusion being less than a distance from the slot axis to an extremity of the jaw end portion;

a second rigid elongated hand member having a jaw end portion, a handle end portion and an intermediate neck portion, the jaw end portion having a mating face and the neck portion defining a bore therethrough;

a pivot member connecting the first and second hand members at their neck portions through the bore and slot for permitting the jaw end portions to move towards each other along the slot axis and to pivot relative to each other about the pivot member.

* * * * *